(12) United States Patent
Kulikyan

(10) Patent No.: US 12,282,671 B2
(45) Date of Patent: Apr. 22, 2025

(54) HARDWARE FILE SYSTEM

(71) Applicant: The Boeing Company, Arlington, VA (US)

(72) Inventor: Ashot Kulikyan, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 12 days.

(21) Appl. No.: 18/312,982

(22) Filed: May 5, 2023

(65) Prior Publication Data

US 2024/0370192 A1    Nov. 7, 2024

(51) Int. Cl.
G06F 3/06         (2006.01)

(52) U.S. Cl.
CPC .............. *G06F 3/064* (2013.01); *G06F 3/061* (2013.01); *G06F 3/0659* (2013.01); *G06F 3/0679* (2013.01)

(58) Field of Classification Search
CPC ........ G06F 3/064; G06F 3/061; G06F 3/0659; G06F 3/0679
See application file for complete search history.

(56) References Cited

U.S. PATENT DOCUMENTS

| | | | |
|---|---|---|---|
| 5,634,050 A | 5/1997 | Krueger et al. | |
| 7,457,822 B1 | 11/2008 | Barrall et al. | |
| 8,224,877 B2 | 7/2012 | Barrall et al. | |
| 8,898,460 B2 | 11/2014 | Abzarian et al. | |
| 10,176,189 B2 | 1/2019 | Berrington et al. | |
| 10,187,788 B2 | 1/2019 | Yang | |
| 10,572,451 B2 | 2/2020 | Ramirez et al. | |
| 2009/0307291 A1 | 12/2009 | Ye et al. | |
| 2012/0311231 A1* | 12/2012 | Porterfield | G11C 16/06 711/E12.008 |
| 2015/0186401 A1* | 7/2015 | Baldwin | G06F 16/1724 707/693 |
| 2017/0161294 A1 | 6/2017 | Ganjihal et al. | |
| 2018/0217926 A1* | 8/2018 | Ogawa | G06F 3/0679 |
| 2018/0341406 A1* | 11/2018 | Sankule | G06F 3/0679 |

(Continued)

FOREIGN PATENT DOCUMENTS

| | | |
|---|---|---|
| CN | 102426586 A | 4/2012 |
| CN | 102708075 A | 10/2012 |

(Continued)

OTHER PUBLICATIONS

Cardarilli et al., "A Fault Tolerant Hardware Based File System Manager for Solid State Mass Memory," IEEE Conference Paper, Jun. 2003, pp. V-649 to V-652.

*Primary Examiner* — Edward J Dudek, Jr.
(74) *Attorney, Agent, or Firm* — MH2 Technology Law Group LLP

(57) ABSTRACT

An electronic file system for storing and retrieving data from an electronic physical memory device is presented. The electronic physical memory device includes an enumerated plurality of fixed-size blocks. The electronic file system includes: a finite state machine controller and an electronic memory communicatively coupled to the finite state machine controller. The electronic memory stores an available block table and a plurality of allocated block tables. The controller stores, in the available block table, block numbers for blocks that are available to store data, and stores, in each allocated block table, block numbers of blocks that store data of a respective file.

20 Claims, 15 Drawing Sheets

(56) References Cited

U.S. PATENT DOCUMENTS

2019/0347027 A1* 11/2019 Mehra .................... G06F 3/0647
2020/0075103 A1* 3/2020 Lee .................... G11C 16/0483

FOREIGN PATENT DOCUMENTS

| CN | 106326384 A | 1/2017 |
| CN | 106844586 A | 6/2017 |
| EP | 1998270 A1 | 12/2008 |

* cited by examiner

HARDWARE FILE SYSTEM

FIELD

This disclosure relates generally to storing and retrieving data from an electronic memory device.

BACKGROUND

In computers, a file system is responsible for storing and retrieving data from a memory device, such as a flash memory or hard disk drive. In most applications, an operating system controls the file system, e.g., manages where each file starts and ends. Due to the complexity and the number of processing resources needed for file segmentation and desegmentation, there are few cases where a file system gets implemented in hardware without an operating system's intervention. Additionally, because an operating system dedicates a significant amount of computational resources for the file system manager, many high-speed applications cannot meet performance requirements.

For file systems managed by operating systems, memory device performance is degraded for applications with a large memory footprint due to a segmentation and desegmentation process. For example, after storing many files in a memory device, when one of the intermediate files gets deleted, a "hole" becomes available for use. If a file store request is issued and the file size is larger than the hole, the file system manager will split the file into segments and store the file in a non-contiguous space. The desegmentation process makes file tracking complex and computationally expensive. Additionally, memory performance decreases significantly because the retrieval of a single file may require many small-size accesses. To make memory performance better, the file system manager desegments the memory frequently so that tiny holes will not proliferate throughout the memory. However, the desegmentation process alone consumes a significant amount of memory bandwidth.

Many applications, for which memory performance is not a concern, are not affected by the amount of computing resources allocated for a file system manager in the operating system processes. However, for high-speed applications, e.g., where tens of gigabits per second speeds are required for a file transfer, an operating system's file system performance does not suffice.

SUMMARY

According to various embodiments, an electronic file system for storing and retrieving data from an electronic physical memory device is presented. The electronic physical memory device includes an enumerated plurality of fixed-size blocks. The electronic file system includes a finite state machine controller and an electronic memory communicatively coupled to the finite state machine controller. The electronic memory stores an available block table and a plurality of allocated block tables. The controller stores, in the available block table, block numbers for blocks that are available to store data, and stores, in each allocated block table, block numbers of blocks that store data of a respective file.

Various optional features of the above system embodiments include the following. The controller may store a block number in the available block table in at most two clock cycles, and the controller may store a block number in an allocated block table in at most two clock cycles. A lack of desegmentation may not cause performance degradation. For a write operation of a file, the electronic file system may configured to perform operations including: reading an available block number from the available block table; writing data, in the electronic physical memory device, to a block identified by the available block number; and writing the available block number to an allocated block table corresponding to the file. The reading the available block number may include reading the available block number from the available block table at a read pointer location; and the writing the available block number may include writing the available block number to the allocated block table corresponding to the file at a write pointer location; where the operations may further include: incrementing the read pointer location; and incrementing the write pointer location. For a read operation of a file, the electronic file system may be configured to perform operations including: reading an allocated block number from an allocated block table corresponding to the file; and reading data, in the electronic physical memory device, from a block identified by the allocated block number. The reading the allocated block number may include reading the allocated block number from the allocated block table corresponding to the file at a read pointer location. The finite state machine controller and the electronic memory may be implemented in a single integrated circuit. Each block may include at least one kilobyte. The electronic physical memory device may include a flash memory.

According to various embodiments, a method of providing an electronic file system for storing and retrieving data from an electronic physical memory device is presented. The electronic physical memory includes an enumerated plurality of fixed-size blocks. The method is implemented using: a finite state machine controller and an electronic memory communicatively coupled to the finite state machine controller. The method includes: storing, in the electronic memory, an available block table; storing, in the electronic memory, a plurality of allocated block tables; storing, by the finite state machine controller, in the available block table, a block number for a block that is available to store data; and storing, in the electronic memory, by the finite state machine controller, in a respective allocated block table, a block number for a block that stores data of a respective file.

Various optional features of the above method embodiments include the following. The storing the block number for the block that is available to store data may take most two clock cycles, and the storing the block number for the block that stores data of the respective file may take at most two clock cycles. The method may further include multiple read, write, and delete operations, where a lack of desegmentation does not cause performance degradation. For a write operation of a file, the method may include: reading an available block number from the available block table; writing data, in the electronic physical memory device, to a block identified by the available block number; and writing the available block number to an allocated block table corresponding to the file. The reading the available block number may include reading the available block number from the available block table at a read pointer location; the writing the available block number may include writing the available block number to the allocated block table corresponding to the file at a write pointer location; and the method may further include: incrementing the read pointer location; and incrementing the write pointer location. For a read operation of a file, the method may further include: reading an allocated block number from an allocated block table corresponding to the file; and reading data, in the electronic physical memory device, from a block identified by the allocated block number. The reading the allocated block number may include reading the allocated block number from the allocated block table corresponding to the file at a read pointer location. The finite state machine controller and the electronic memory may be implemented in a single integrated circuit. Each block may include at least one kilobyte. The electronic physical memory device may include a flash memory.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DESCRIPTION OF THE EXAMPLES

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

Some embodiments provide a hardware file system that avoids the need to desegment physical memory, without incurring performance degradation. Some embodiments solve the problems associated with file system segmentation and desegmentation overhead. Some embodiments implement a file system manager entirely in hardware and use an algorithm to eliminate segmentation and desegmentation overhead, thus improving data transfer speed. These and other features and advantages are shown and described herein in reference to the figures.

Figure 1:
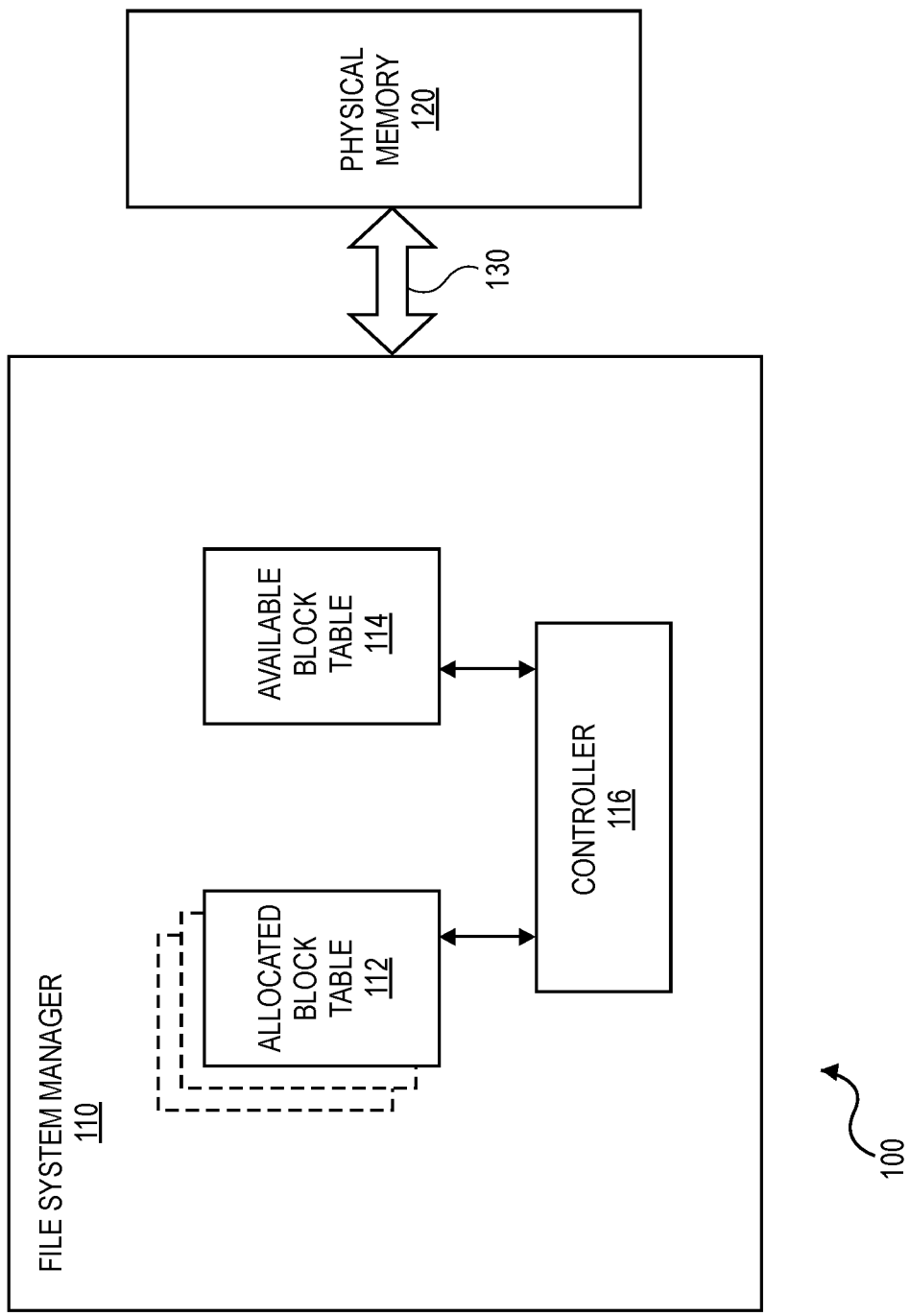
FIG. 1 is a schematic diagram of a hardware file system according to various embodiments.

FIG. 1 is a schematic diagram of a hardware file system 100 according to various embodiments. The hardware file system 100 includes a file system manager 110, which manages data stored in a physical memory 120. The file system manager 110 is communicatively coupled to the physical memory 120 by a bus 130.

The physical memory 120 may be any type of electronic memory, including, by way of non-limiting examples, a hard disc drive, a NAND flash memory, a Synchronous Dynamic (SD) RAM, a Double Data Rate (DDR) RAM, or multiple units of any of the preceding memory types or other electronic memory type.

The file system manager 110 may be implemented in any of a variety of electronic components, such as, by way of non-limiting example, a Field Programmable Gate Array (FPGA), an Application Specific Integrated Circuit (ASIC), or any other type of integrated circuit. The file system manager includes a controller 116, an available block table 114, and a plurality of allocated block tables 112 (e.g., one allocated block table per file).

The controller 116 may be implemented as a finite state machine, which may operate according to a set list of states and corresponding transitions. The controller 116 may lack an operating system. In general, the controller 116 may lack any type of soft instruction set that is interpreted by a processor such as a CPU, and instead be hard coded with transitions that are to be implemented for corresponding states. The controller 116 operates to store data, e.g., block numbers, in the available block table 114 and the allocated block tables 112. According to some embodiments, the controller 116 stores a datum in a block table 112, 114 in one clock cycle. According to some embodiments, the controller 116 stores a datum in a block table 112, 114 in two clock cycles.

The block tables 112, 114, including the allocated block tables 112 and the available block table 114, may be implemented in volatile electronic memory, such as Block RAM (BRAM), by way of non-limiting example.

Details of the operation of the file system manager 110, including the structure and operation of the controller 116 and the allocated block tables 112, 114, and the operation of the file system manager 110 with, and the structure of, the physical memory 120, are described herein in reference to FIGS. 2-15.

Figure 2:
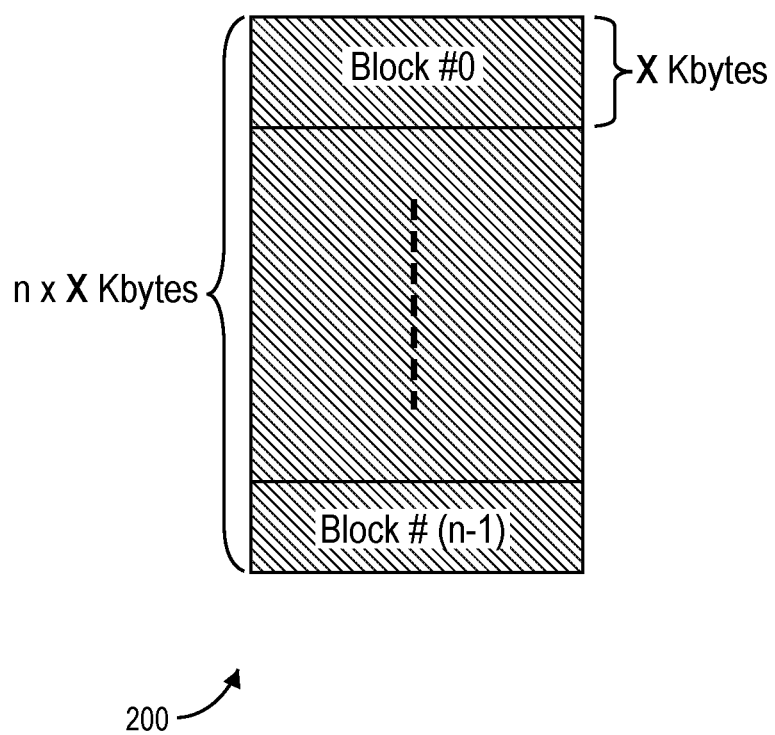
FIG. 2 is a schematic diagram of a physical memory that includes a plurality of fixed-size blocks according to various embodiments.

FIG. 2 is a schematic diagram of a physical memory 200 that includes a plurality of fixed-size blocks according to various embodiments. The physical memory 200 may be used as physical memory 120 as shown and described in reference to FIG. 1 according to various embodiments. For example, the physical memory may include one or multiple individual physical memory units, such as one or multiple hard disc drives, NAND flash memories, SD RAMs, or DDR RAMs. The physical memory 200 may be any size and may range from 10 KB to 10 TB or more.

The physical memory 200 includes a plurality of fixed-size blocks of bits. The blocks are allocated spaces are need not be physically demarcated as such. Each block may be any size and may range from, e.g., 1 KB to 10 GB or more. The blocks are shown in FIG. 2 as enumerated from 0 to n-1, for a total of n blocks.

Each block number from 0 to n-1 is a unique identifier of a physical memory space used as an entry element for the block tables. In general, to keep track of different files, data coming to the hardware file system may have an associated file identifier. A file identifier may be associated with data by appending it, prepending it, or including it with the data, by way of non-limiting examples. The hardware file system uses the file identifier to select an associated allocated block table for a given operation. Each allocated block table serves only a single file identifier. If X number of files that the hardware file system needs to store, it will maintain X number of allocated block tables; one table per file identifier. However, there may be only a single available block table.

A high-level overview of the operation of a hardware file system according to various embodiments is as follows. When there is a data storage request, the controller, based on the file identifier, reads out the available block number from the available block table and stores the block number into the file identifier's associated allocated block table. After the block allocation, the data gets written into the allocated block in the physical memory. If the requested storage size is larger than the block size, the controller will allocate more blocks until the entire file gets written. In case of a retrieval request, the controller reads out the block number from the file identifier's associated allocated block table, then goes to the block in physical memory for readout. Suppose there is more than one block allocated for a given file identifier; in that case, the controller will read the block numbers one by one and retrieve the data from the associated physical memory block until the entire file is readout. In case of a delete operation, the controller reads out the block numbers from the associated allocated block table and writes block numbers back into the available block table. Adding block numbers back into the available block table indicates freeing up physical memory space.

The following provides non-limiting example details of blocks, file identifiers, the available block table, the allocated block tables, and different operations that a hardware file system can perform according to various embodiments.

According to various embodiments, a block may be an allocated space in physical memory. The blocks may have fixed sizes, as depicted in FIG. 2. A unique number may be assigned to each block, which differentiates different blocks and gets used by the available block table and the allocated block tables for the hardware file system's operation. The numbering of the blocks may be done in incremental order, i.e., 0 to (n-1) for at total of n blocks. The start address of each block may be calculated by multiplying the block number by the size of the block.

According to various embodiments, a file identifier is a unique number or other datum associated with each file. Embodiments may use the file identifiers to distinguish between different files. Further, each file identifier may have its own allocated block table. File identifiers may be provided in (e.g., appended to) packets received by various embodiments. The embodiments extract the file identifier from the packets and process the data accordingly. In general, a file identifier may be implemented as a number, a text datum, a hash, an alphanumeric datum, or any other datum.

Figure 3:
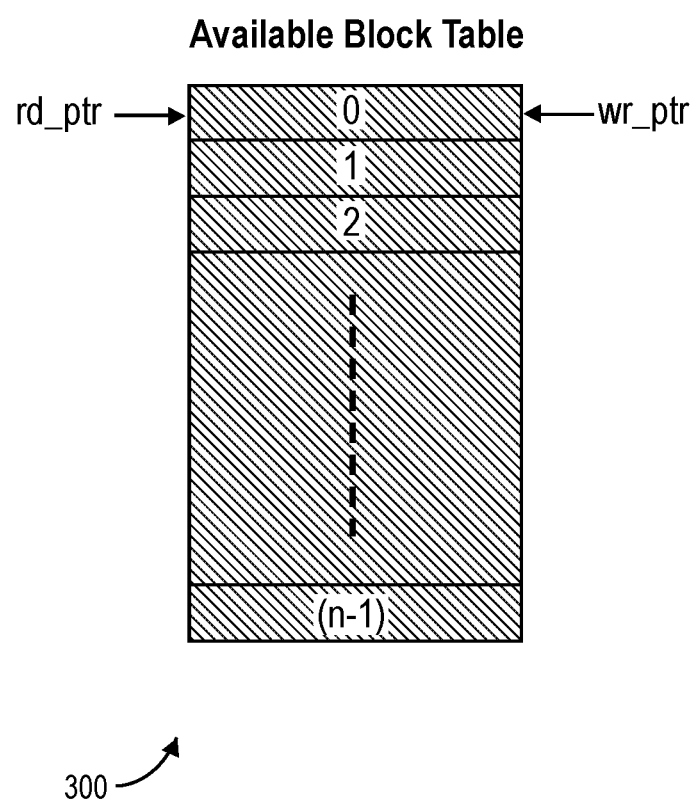
FIG. 3 is a schematic diagram of an available block table at startup according to various embodiments.

According to various embodiments, an available block table is a memory that holds the list of available free block numbers in physical memory. According to various embodiments, there is only one available block table in the hardware file system that serves multiple file identifiers. The number of entries in the table may be calculated by dividing the physical memory size by the block size. Because the entire physical memory is free at the startup, the available block table is full at that time; the available block table holds block numbers from 0 to (n-1). Writes and reads to the available block table are controlled by write and read pointers. The write and read pointers may get incremented or wrapped around back to 0. In other words, the pointers may run circularly. FIG. 3 shows the startup state of the available block table.

FIG. 3 is a schematic diagram of an available block table 300 at startup according to various embodiments. The available block table 300 may be used as the available block table 114 as shown and described herein in reference to FIG. 1 according to various embodiments. For example, the available block table 300 may be stored in volatile electronic memory, such as Block RAM (BRAM), by way of non-limiting example.

Figure 4:
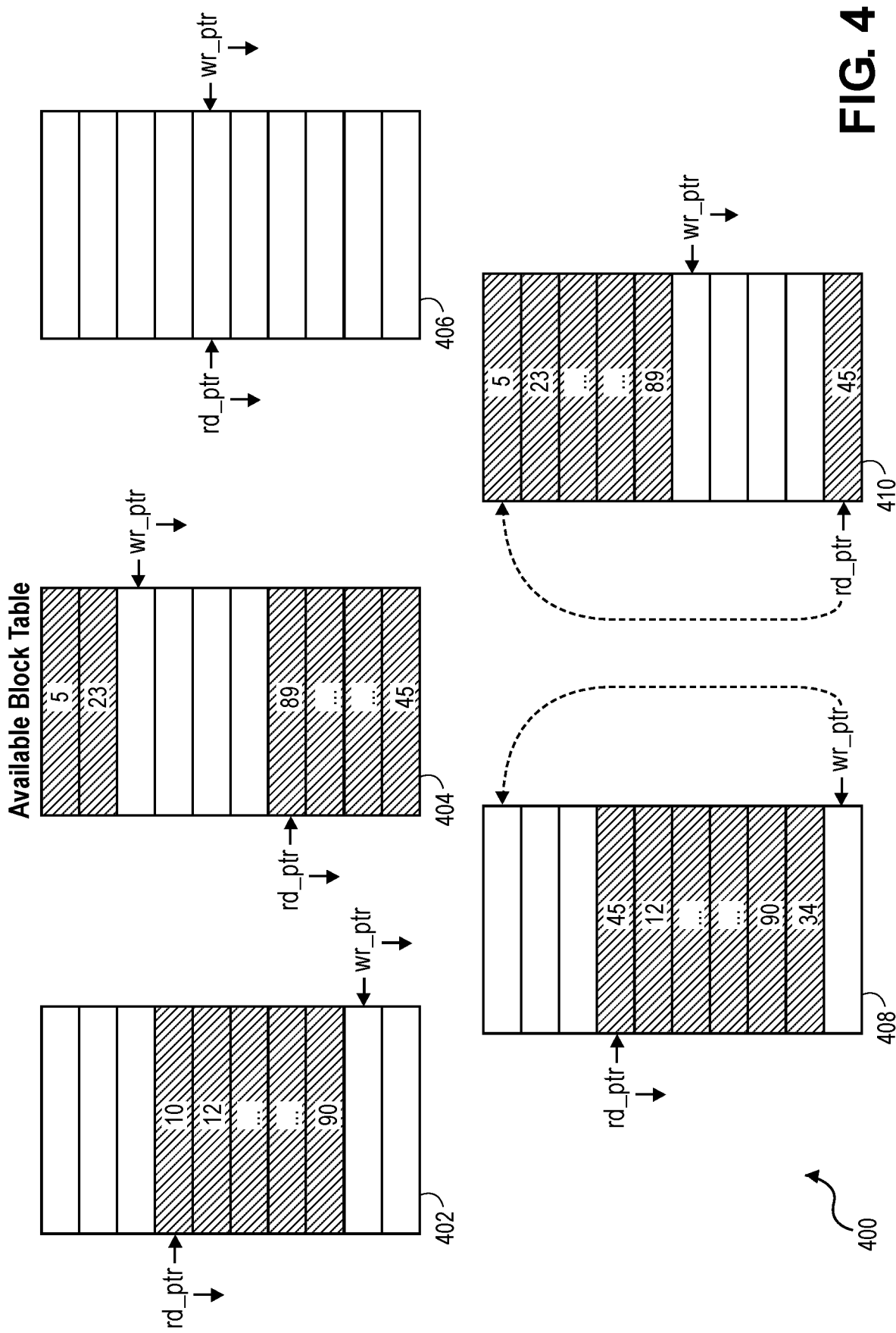
FIG. 4 is a schematic diagram of various pointer states of an available block table according to various embodiments.

As shown in FIG. 3, a read pointer ("rd_ptr") and a write pointer ("wr_ptr") point to the table's first location, indicating that the table is full. When a file write request is issued, the controller allocates a block in physical memory by reading the available block from the rd_ptr location. After the block gets read out from the table, rd_ptr gets incremented by the controller. Also, note that the block number is written into the file identifier's associated allocated block table every time a block number gets read out from the table. When deleting a file, the controller reads the block number from the file's associated allocated block table and writes the block number into the available block table. Every time a block number gets written into the available block table, wr_ptr will get incremented or wrapped around when wr_ptr points to the last location in the table. FIG. 4 shows different states of read and write pointers to illustrate the circular operation of the pointers.

FIG. 4 is a schematic diagram of various pointer states 400 of an available block table according to various embodiments. As shown in FIG. 4, for each pointer state 400, there are two arrows on each pointer. The horizontal arrow points to the entry in the table. The vertical arrow shows the direction of pointer change. The pointers can either get incremented or wrapped around. As shown in states 402, 404, and 406, the pointers will get incremented after a read or write operation on the table. State 408 shows the state when write operation will result in wr_ptr to wrap around. State 410 shows the state when rd_ptr will wrap around after the read operation is complete. A similar write and read pointer handling approach is used to access the allocated block table.

According to various embodiments, an allocated block table is a memory that holds the list of allocated block numbers per file identifier. For example, if there are N number of files that are to be stored, then the hardware file system may allocate N number of allocated block tables, one table per file identifier. The depth (e.g., length) of each allocated block table maybe the same as the depth of the available block table; the depth may be computed as total physical memory size divided by the block size. At the startup of the hardware file system, the allocated block tables are free; both write and read pointers are pointing to the 0-th location of the table. The startup condition of a plurality of allocated block tables is shown in reference to FIG. 5.

Figure 5:
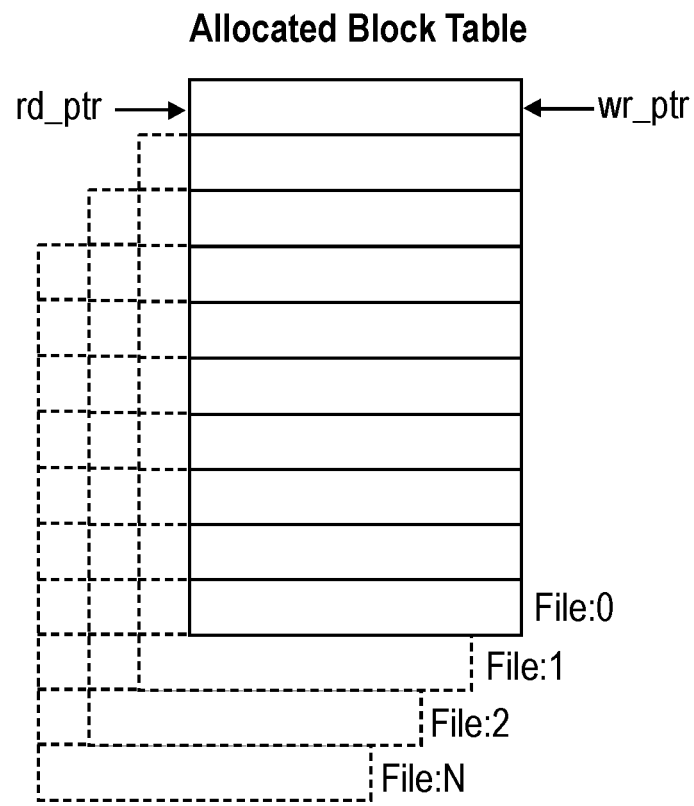
FIG. 5 is a schematic diagram of a plurality of allocated block tables at startup according to various embodiments.
Figure 6:
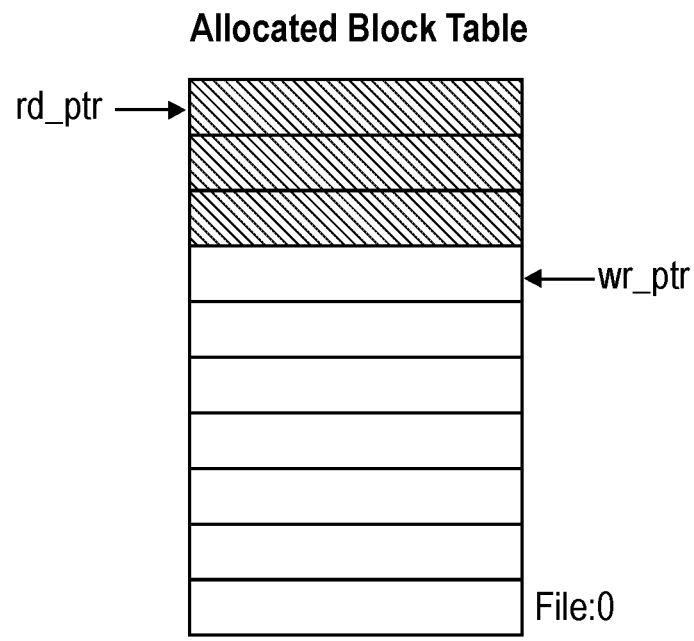
FIG. 6 is a schematic diagram of an allocated block table after an example file is stored in physical memory according to various embodiments.
Figure 7:
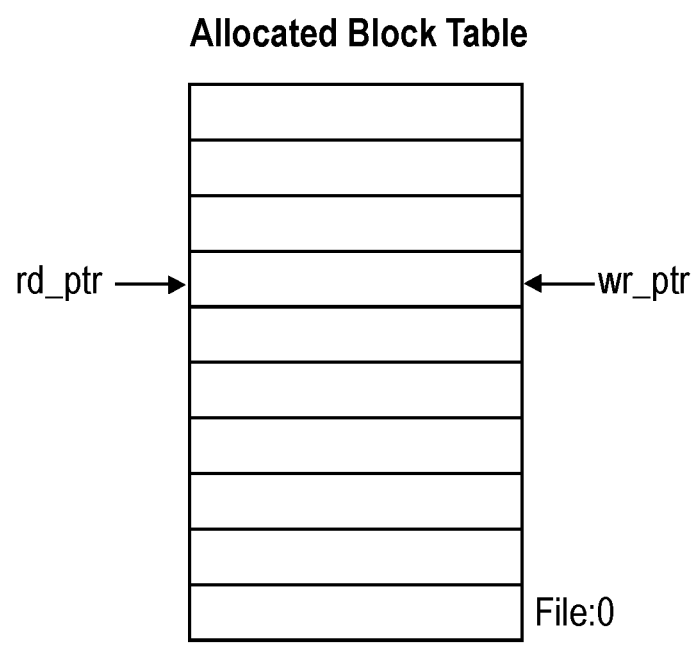
FIG. 7 is a schematic diagram of the allocated block table of FIG. 6 after the example file is deleted from physical memory according to various embodiments.

FIGS. 5, 6, and 7 present a continued example of various write, read, and delete operations performed according to an example hardware file system, e.g., the hardware file system 100 as shown and described herein in reference to FIG. 1. The example begins with the situation depicted in FIG. 5, with all allocated block tables at startup. The continued example depicts various states of one such allocated block table after the operations are performed, as described in detail herein.

FIG. 5 is a schematic diagram of a plurality of allocated block tables 500 at startup according to various embodiments. The allocated block tables 500 may be used as the allocated block tables 112 as shown and described herein in reference to FIG. 1 according to various embodiments. For example, the allocated block tables 500 may be stored in volatile electronic memory, such as Block RAM (BRAM), by way of non-limiting example.

The file identifier is depicted on the lower right corner per each allocated block table. When the hardware file system receives a file store request for file identifier 0, it will first go to the available block table and read out the next available block. Then read out block number will be written into the file identifier's associated allocated block table, which is the File: 0 table for the example shown in FIG. 5. After the write, wr_ptr of the allocated block table gets incremented. The controller then writes incoming data into the allocated block in physical memory. If the file size is larger than the block size, the controller keeps allocating available blocks from the available block table until the entire file gets written. Every time a new block gets allocated, the block gets stored into the allocated block table, and the wr_ptr gets incremented. FIG. 6 shows the allocated block table for file identifier 0, for the non-limiting example of three blocks getting allocated for the file.

FIG. 6 is a schematic diagram of an allocated block table 600 after an example file (file 0) is stored in physical memory according to various embodiments. The allocated block table 600 may represent the allocated block table for file 0 from the allocated block tables 500 of FIG. 5 after such a write operation. Note that the wr_ptr has incremented three places, corresponding to the three blocks in physical memory allocated for storage of the file. To read out file 0, the controller reads out the block numbers from the file's associated allocated block table, block numbers 0, 1, and 2, in this non-limiting example, and goes to the blocks in physical memory for the file's read out.

FIG. 7 is a schematic diagram of the allocated block table of FIG. 6 after the example file is deleted from physical memory according to various embodiments. In general, when a delete operation gets performed on a file, the controller will read out block numbers from the allocated block table for the deleted file and write them back into the available block table. FIG. 7 depicts the state of the pointers after file 0 is deleted from physical memory, starting from the situation depicted in FIG. 6. As seen in FIG. 7, after file 0 gets deleted, the write and read pointers point to the same location, meaning that the allocated block table for identifier 0 is empty.

Figure 8:
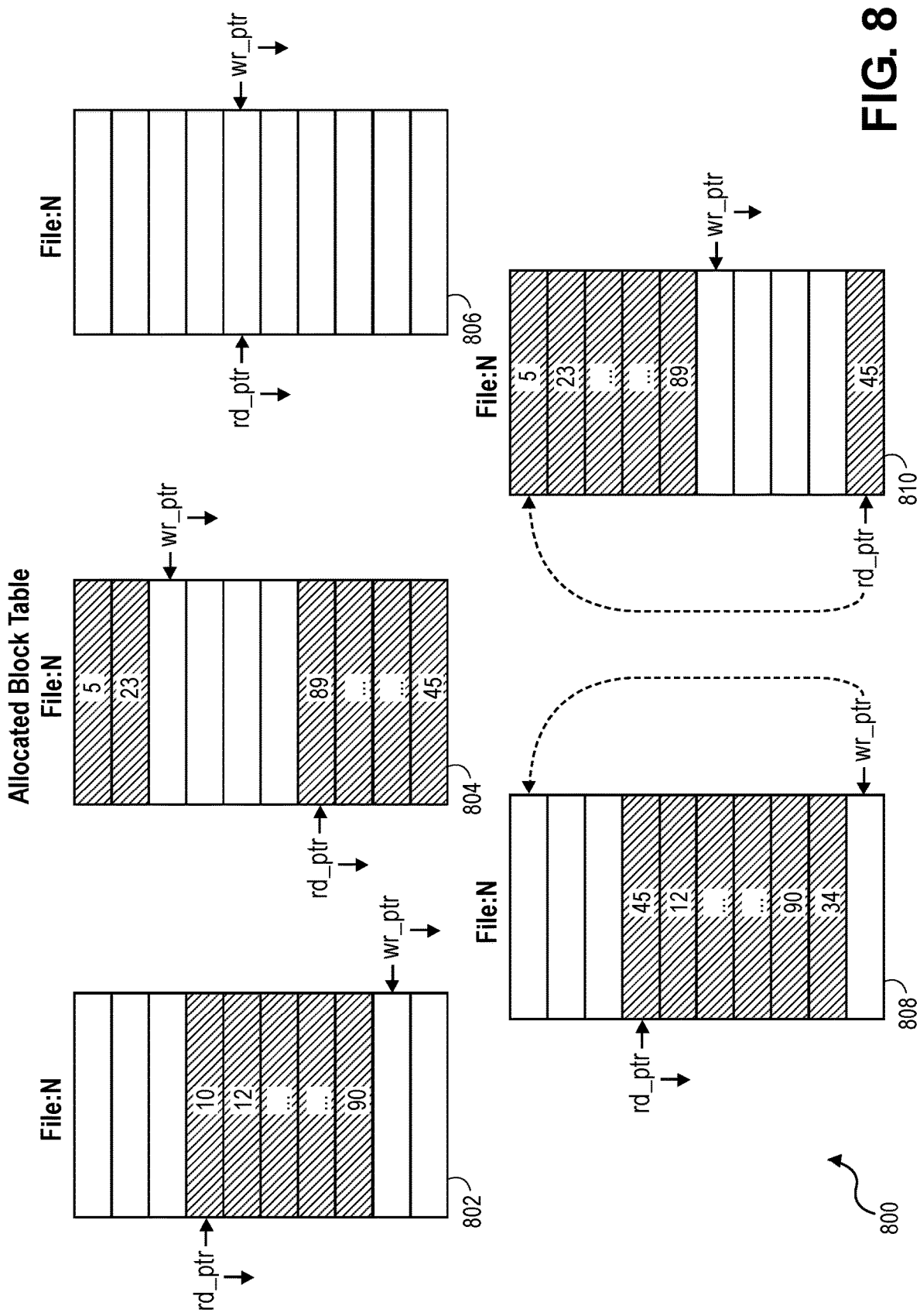
FIG. 8 is a schematic diagram of various pointer states of the allocated block table according to various embodiments.

Continuing the example, suppose the hardware file system receives another store request for file identifier 0. In that case, it again allocates block number from the available block table and writes the block number into the file identifier's allocated block table. Every time a new block gets written into the allocated block table, wr_ptr gets incremented. When wr_ptr reaches the last location of the table, it wraps around back to 0. FIG. 8 shows various states for write and read pointers and the direction of pointer change.

FIG. 8 is a schematic diagram of various pointer states 800 of an allocated block table according to various embodiments. The write and read pointers in FIG. 8 have two arrows attached; one is vertical, and the other is horizontal. The horizontal arrow points to the entry in the table. The vertical arrow shows the direction of pointer change. In states 802, 804, and 806, the vertical arrows point down for both read and write pointers, which means that the pointers will only get incremented in those scenarios. In states 808 and 810, wr_ptr and rd_ptr will wrap around, because they point to the last location in their respective table. Note that because in this example the allocated block table depth is the same as the depth of the available block table, it is not possible for wr_ptr to pass rd_ptr. However, both wr_ptr and rd_ptr can be equal and point to the same location, indicating that the table is empty.

Figure 9:
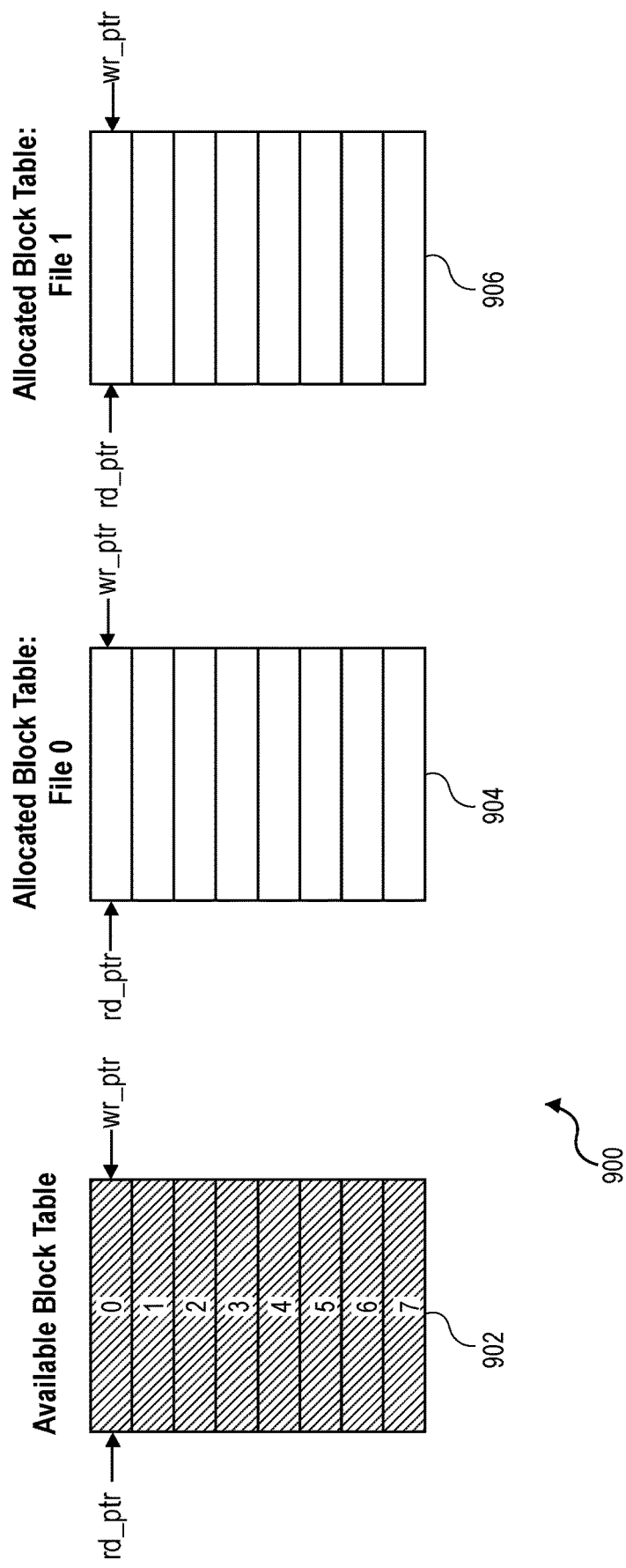
FIG. 9 is a schematic diagram of block table states of a hardware file system at startup according to various embodiments.

FIGS. 9-14 present a continued example of various write, read, delete, and simultaneous write and read operations performed according to an example hardware file system, e.g., the hardware file system 100 as shown and described herein in reference to FIG. 1. The example begins with the situation depicted in FIG. 9, showing an available block table and two allocated block tables at startup. The continued example depicts various states of an associated available block table and the allocated block tables after the operations are performed, as described in detail herein.

FIG. 9 is a schematic diagram of block table states 900 of a hardware file system at startup according to various embodiments. In particular, FIG. 9 depicts a non-limiting example embodiment with eight total blocks in physical memory and two file identifiers. Note that there are two allocated block tables 904, 906, which means that this example hardware file system can handle two files. FIG. 9 shows the startup states 900 of the block tables, including pointer positions. As shown in FIG. 9, the available block table 902 is full at startup. By contrast, the allocated block tables 904, 906 are empty, because no files have been written into the physical memory.

Figure 10:
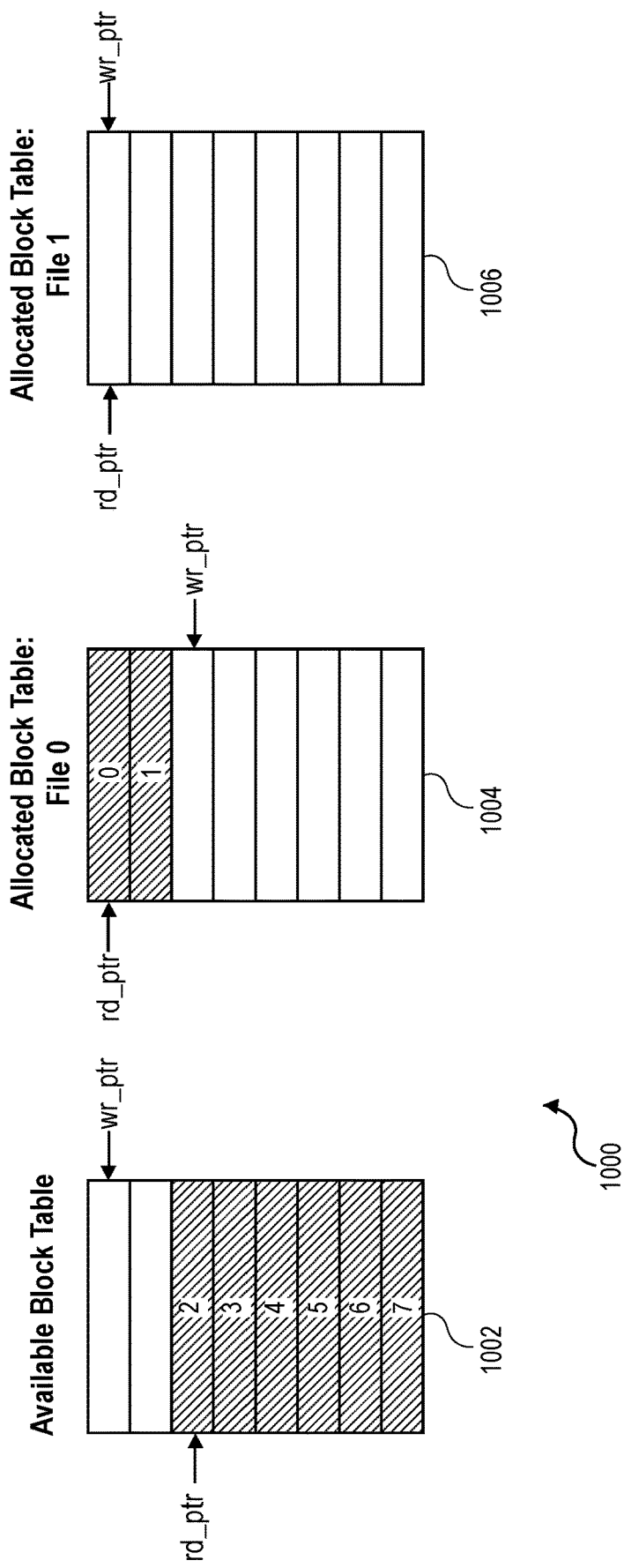
FIG. 10 is a schematic diagram of block table states of the hardware file system of FIG. 9 after a first file is stored in physical memory according to various embodiments.

FIG. 10 is a schematic diagram of block table states of the hardware file system of FIG. 9 after a first file is stored in physical memory according to various embodiments. Continuing the ongoing example depicted in reference to FIGS. 9-14, consider that a file write request is issued for file identifier 0, and the file fits into two blocks. The controller reads out two blocks from the available block table 1002 and writes the block numbers into the allocated block table 1004 for file identifier 0. After blocks get allocated for the file, the controller writes the file into the allocated blocks in the physical memory. FIG. 10 shows the state of the tables after file 0 write is complete. Note that the allocated block table 1006 for file 1 is unchanged.

Figure 11:
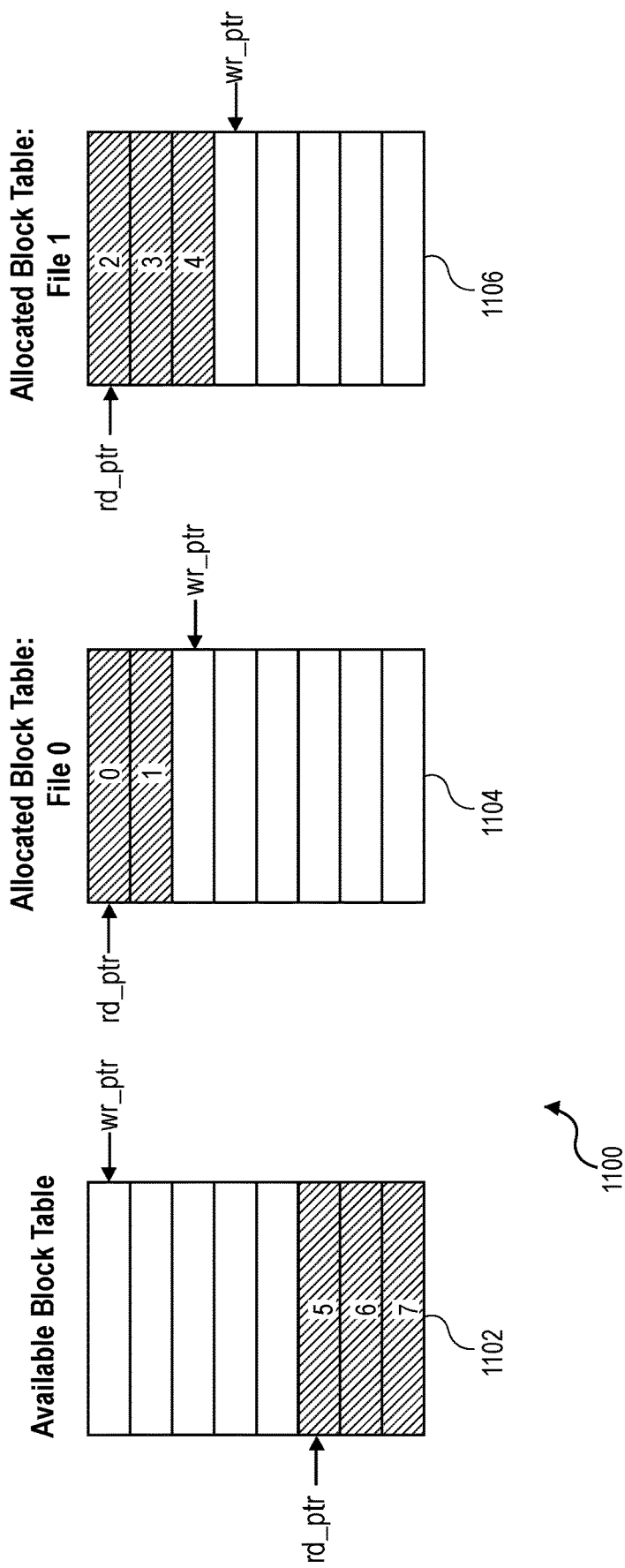
FIG. 11 is a schematic diagram of block table states of the hardware file system of FIG. 10 after a second file is stored in physical memory according to various embodiments.

FIG. 11 is a schematic diagram of block table states 1100 of the hardware file system of FIG. 10 after a second file is stored in physical memory according to various embodiments. Continuing the ongoing example depicted in reference to FIGS. 9-14, and starting from the block table states 1000 of FIG. 10, when the hardware file system receives another write request, this time for file 1, it follows the same procedure as for file 0. Assuming, by way of non-limiting example, that file 1 fits into three blocks, the block table contents after block allocation are shown in FIG. 11. As seen in FIG. 11, the available block table 1102 is down to three available blocks. The allocated block tables 1104, 1106 contain the block numbers representing the files' physical locations in the storage memory.

Continuing the ongoing example depicted in reference to FIGS. 9-14, and starting from the block table states 1100 of FIG. 11, consider a read operation where two files are already written. In general, in the case of a read operation, the content of the block tables does not change, nor do the write and read pointers. By way of non-limiting example, the hardware file system may receive a read request on file identifier 1. The controller goes to the allocated block table 1106 for file 1 and reads out the block number at rd_ptr location, block number 2, as seen in FIG. 11. Then, the controller reads the data for file 1 from the block in the physical memory. If the controller reaches the end of the block and the read is not yet complete, it goes to the allocated block table 1106 for file 1 and reads the next block, block number 3. The controller repeats the same steps until the entire file gets read out. This procedure applies to reading any of the files stored in the physical memory.

Figure 12:
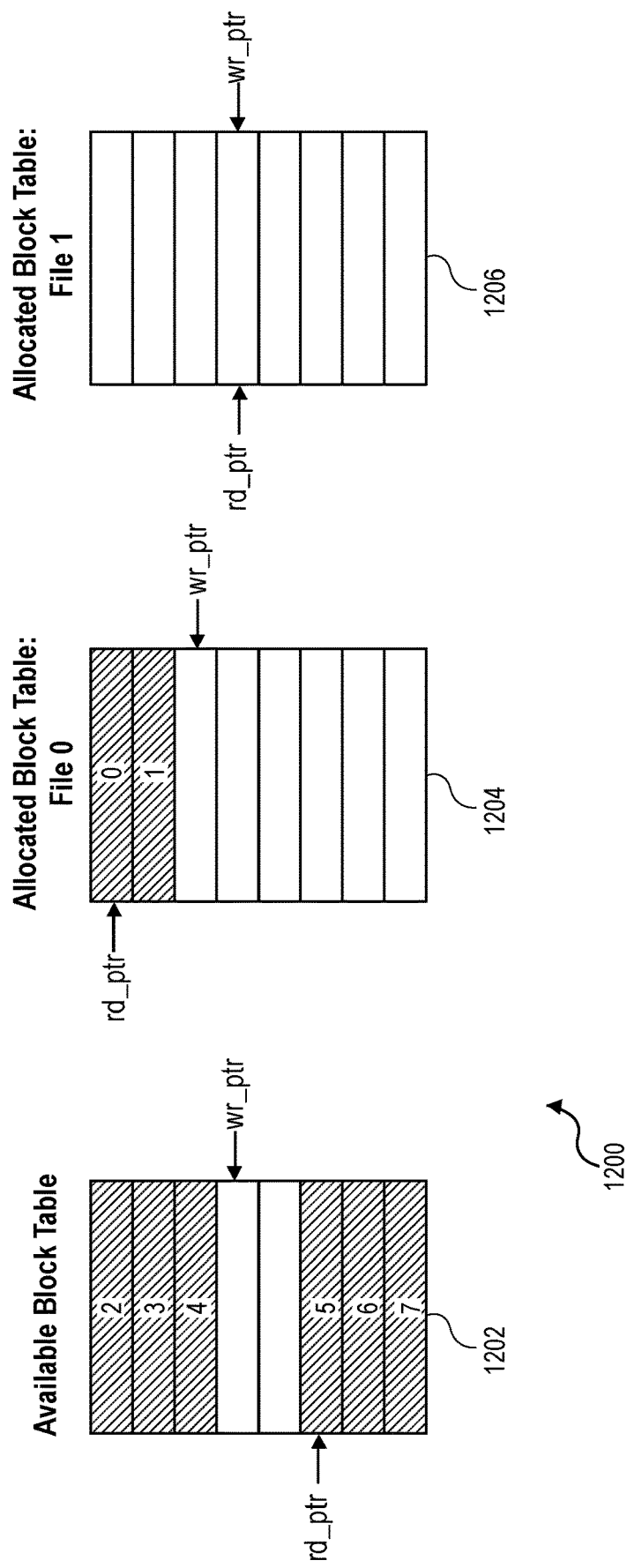
FIG. 12 is a schematic diagram of block table states of the hardware file system of FIG. 11 after the second file is deleted from physical memory according to various embodiments.

FIG. 12 is a schematic diagram of block table states 1200 of the hardware file system of FIG. 11 after the second file is deleted from physical memory according to various embodiments. In general, when performing a file delete operation, the controller reads block numbers from the corresponding allocated block table and writes them back into the available block table. Continuing the ongoing example depicted in reference to FIGS. 9-14, and starting with the block table states 1100 of FIG. 11, consider a file delete request issued for file identifier 1. The controller will read block numbers from the allocated block table 1206 for file 1 and store them in the available block table 1202. As seen in FIG. 12, the allocated block table 1206 for file 1 is empty; both write and read pointers point to the same location. On the other hand, the available block table 1202 contains the block numbers from the allocated block table 1206. The allocated block table 1204 for file 0 is unchanged.

Figure 13:
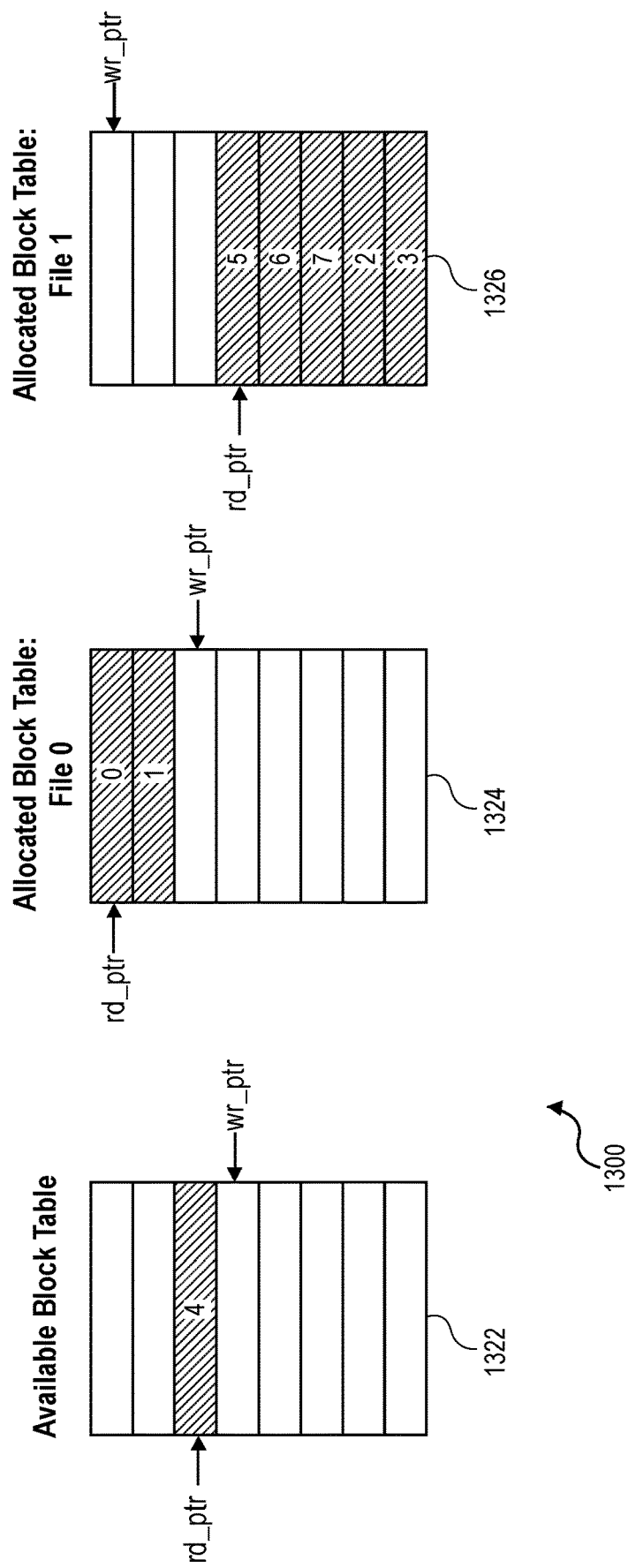
FIG. 13 is a schematic diagram of block table states of the hardware file system of FIG. 12 after a third file is stored in physical memory according to various embodiments.

FIG. 13 is a schematic diagram of block table states 1300 of the hardware file system of FIG. 12 after a third file is stored in physical memory according to various embodiments. Continuing the ongoing example depicted in reference to FIGS. 9-14, and starting from the block table states 1200 of FIG. 12, consider that there is a new write request for file identifier 1 and that the file will fit into five blocks. The controller will allocate five blocks from the available block table 1302. As shown in FIG. 13, the allocated block table 1306 for file identifier 1 has five blocks allocated from the available block table 1302; block numbers 5, 6, 7, 2 and 3. Further, the available block table 1302 has only one block available for allocation. Looking at the pointer states, for file identifier 1, wr_ptr has wrapped around since it has reached the table's last location. The allocated block table 1304 for file 0 is unchanged.

Figure 14:
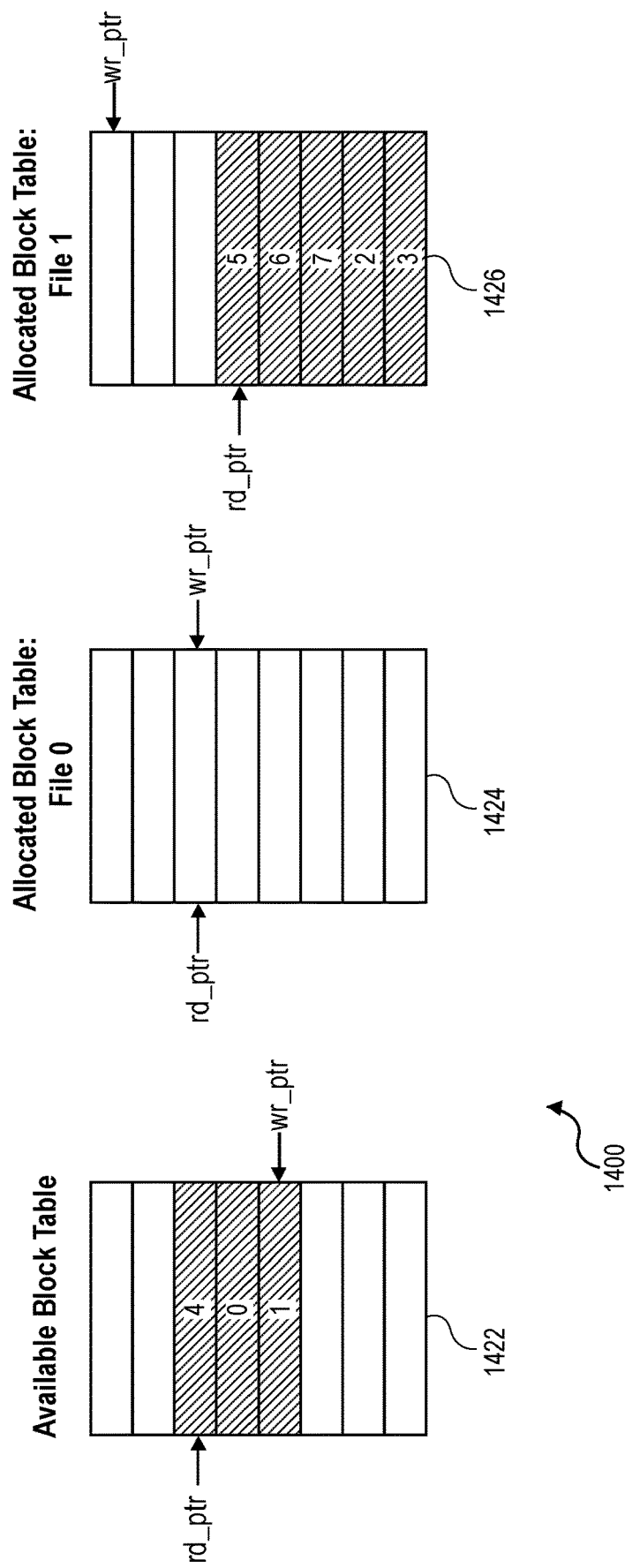
FIG. 14 is a schematic diagram of block table states of the hardware file system of FIG. 13 after the first file is deleted from physical memory according to various embodiments.

FIG. 14 is a schematic diagram of block table states 1400 of the hardware file system of FIG. 13 after the first file is deleted from physical memory according to various embodiments. Continuing the ongoing example depicted in reference to FIGS. 9-14, and starting from the block table states 1300 of FIG. 13, consider another delete operation issued to the hardware file system, but this time the delete operation is issued for file identifier 0. Upon receiving the delete request, the controller reads out block numbers from the allocated block table 1404 for file identifier 0 and writes them back into the available block table 1402. As shown in FIG. 14, the available block table 1402 holds the blocks from the allocated block table 1204 for file 0, namely, block numbers 0 and 1. The allocated block table 1204 for file 0 is empty; both write and read pointers point to the exact location in the table. The allocated block table 1306 for file 1 is unchanged.

Figure 15:
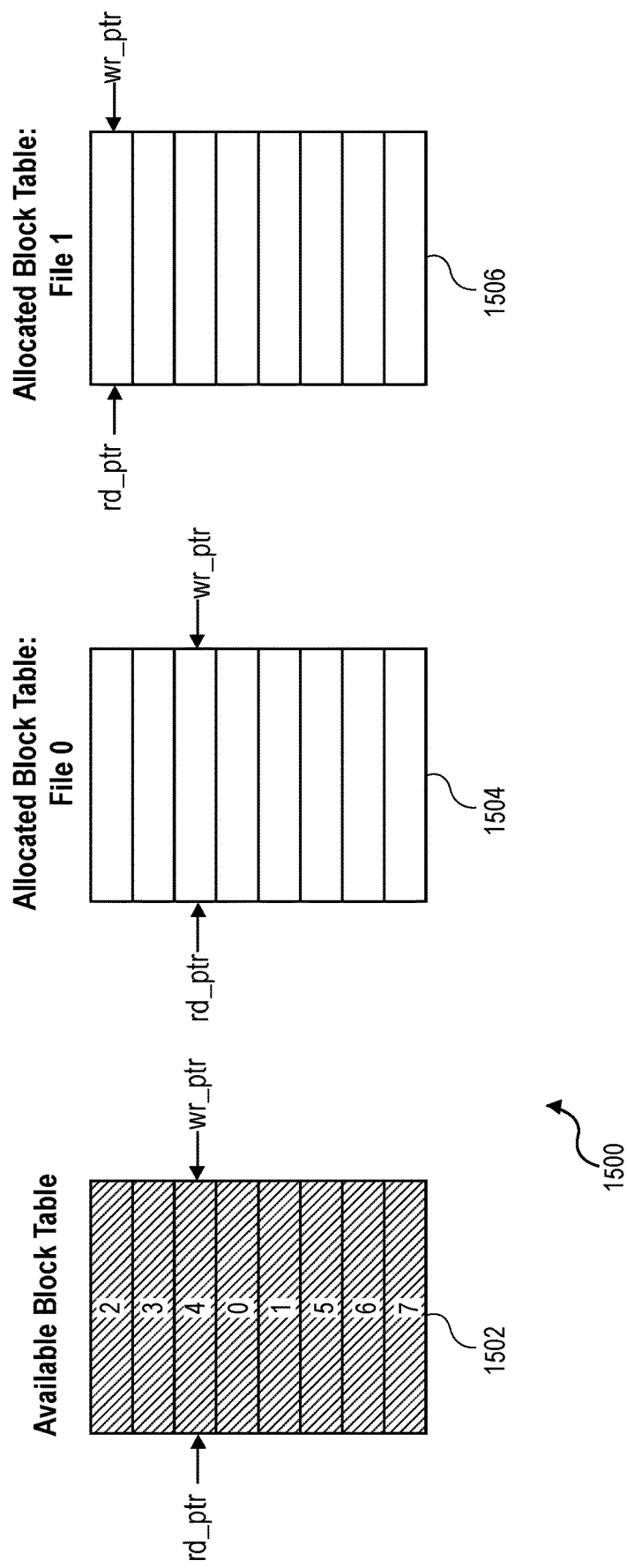
FIG. 15 is a schematic diagram of block table states of the hardware file system of FIG. 14 after the third file is deleted from physical memory according to various embodiments.

FIG. 15 is a schematic diagram of block table states 1500 of the hardware file system of FIG. 14 after the third file is deleted from physical memory according to various embodiments. Continuing the ongoing example depicted in reference to FIGS. 9-14, and starting from the block table states 1400 of FIG. 14, consider that the hardware file system receives another delete request, this time for file identifier 1. Again, because it is a delete operation, the controller reads the blocks from the allocated block table 1506 for file 1 and writes them back into the available block table 1502. After deleting file 1, its allocated block table 1506 is empty. Further, the available block table 1502 is full because it contains all the available blocks. The allocated block table 1504 for file 0 is unchanged. Note that the block numbers are no longer in an incremental order in the available block table due to multiple writes, reads, and delete operations. Moreover, there is no need to perform desegmentation processes on the physical memory.

Some embodiments can accommodate simultaneous read and write operations. In general, the architecture of various embodiments is such that write and read operations may be executed decoupled from one another. For write requests, the controller first accesses the available block table to allocate available blocks for incoming file requests and writes the blocks into the allocated block table. Then, the controller writes the data into the allocated blocks in the physical memory. Further, an issued read request already contains the blocks in the associated allocated block table indicating where the respective file is stored. Thus, for executing read requests, the controller reads the block numbers out from the allocated block table and goes to the block in the physical memory for a file readout.

Figure 16:
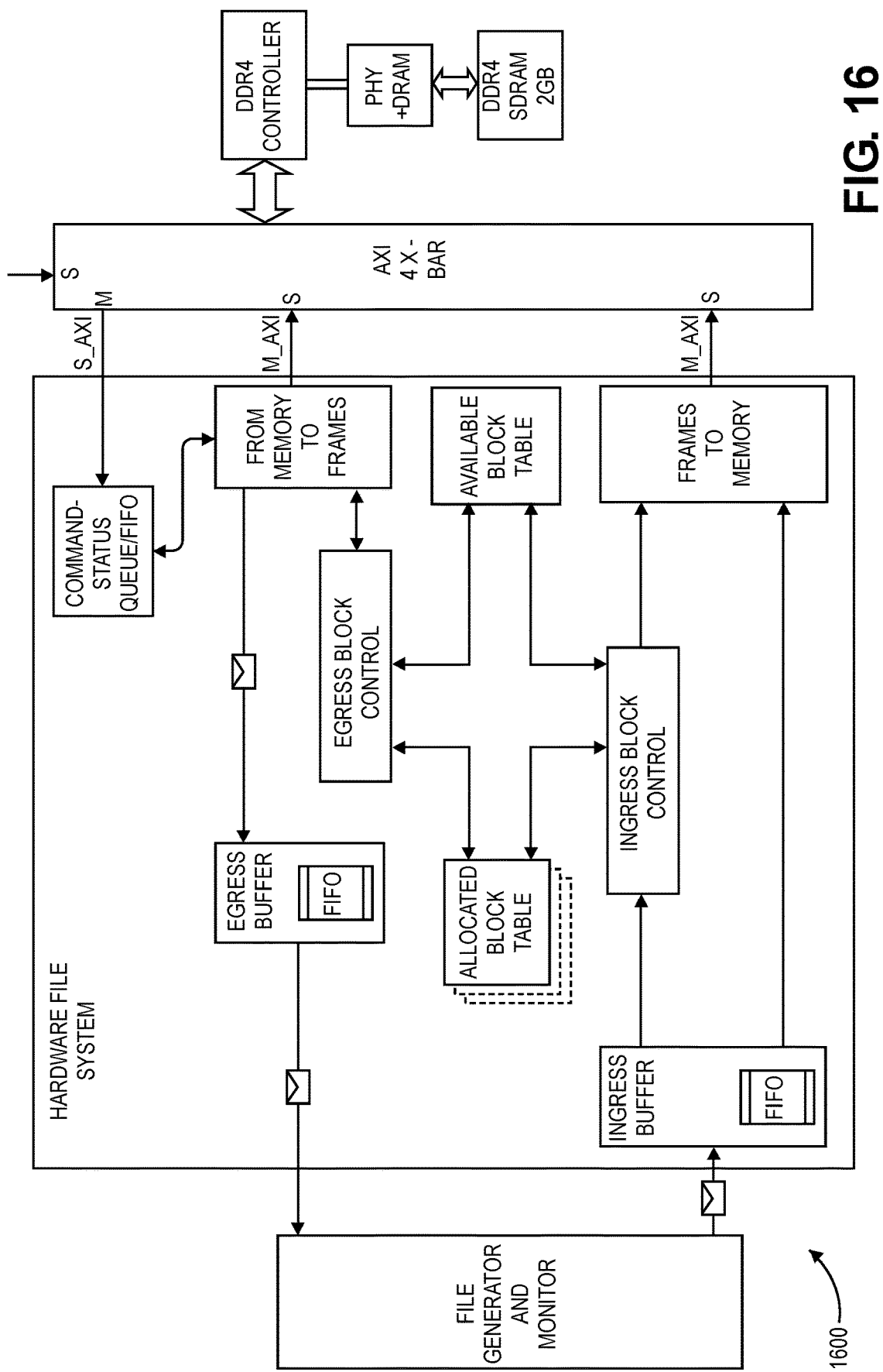
FIG. 16 is a schematic diagram of a reduction to practice of a hardware file system according to an embodiment.

FIG. 16 is a schematic diagram of a reduction to practice 1600 of a hardware file system according to an embodiment. The reduction to practice was implemented using Xilinx's ZCU102 platform. FIG. 16 shows an allocated block table, an available block table, and ingress-egress block control modules. The ingress-egress block control modules are responsible for handling write and read pointers for the allocated and available block tables. The tables were implemented on on-chip BRAM memories. File generator and monitor is a synthesizable module that generates the files and collects them in a read operation.

The reduction to practice was tested on four files, with four allocated block tables. The physical memory used in the reduction to practice was DDR4 SDRAM with 2 GB of memory storage. The file transfer rate on the ingress side was 10 Gbps. The maximum rate achieved on file storage and retrieval was also 10 Gbps. Multiple corner cases were tested to prove the algorithm's robustness, especially on the corners where read and write pointers wrap around for the allocated block table and the available block table. All tests were successful.

Thus, a hardware file system that eliminates the overhead posed by segmentation and desegmentation processes in a software operating system file manager is presented. For operating system controlled file systems, soft instructions fetching a soft pointer to a memory location may take on the order of 60 clock cycles. By contrast, some embodiments use system-level commands in a finite state machine controller to fetch a block number from an allocated block table in at most two clock cycles. Thus, embodiments do not suffer from increasingly degraded performance when a file is spread over multiple memory locations, in contrast with operating system managed file systems. Further, even if a file is stored across discontinuous blocks according to an embodiment, there is no need for desegmentation because the block numbers that identify the file storage locations are readily available in a highly efficient manner.

Some embodiments improve file transfer rate significantly. Embodiments are useful for very high-speed applications and file sizes in the range of, for example, a few Mbytes to multiple Gbytes.

Additionally, according to some embodiments, all the blocks have an equal probability of being accessed, which is beneficial for a specific type of memory, e.g., NAND Flash memories. For example, for memories that have a finite number of read/write operations for each memory location, embodiments may be used to ensure that each memory location in a physical memory encounters the same number of read/write operations, such that no subset of memory locations wears out before another subset of memory locations. This extends the life cycle of physical memory.

Further, embodiments are simple to implement in hardware.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. § 112 (f). However, for any claims containing elements designated in any other manner, it is intended that such elements are not to be interpreted under 35 U.S.C. § 112 (f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. An electronic file system for storing and retrieving data from an electronic physical memory device, the electronic physical memory device comprising an enumerated plurality of fixed-size blocks, the electronic file system comprising:
a finite state machine controller; and
an electronic memory communicatively coupled to the finite state machine controller, the electronic memory storing an available block table, the electronic memory storing a plurality of allocated block tables,
wherein the controller stores, in the available block table, block numbers for blocks that are available to store data,
wherein the controller stores, in each allocated block table, block numbers of blocks that store data of a respective file, and
wherein, for a write operation of a file, the electronic file system is configured to perform operations comprising:
reading an available block number from the available block table at a read pointer location;
writing data, in the electronic physical memory device, to a block identified by the available block number; and
writing the available block number to an allocated block table corresponding to the file at a write pointer location;
incrementing the read pointer location; and
incrementing the write pointer location.

2. The electronic file system of claim 1, wherein the controller stores a block number in the available block table in at most two clock cycles, and wherein the controller stores a block number in an allocated block table in at most two clock cycles.

3. The electronic file system of claim 1, wherein a lack of desegmentation does not cause performance degradation.

4. The electronic file system of claim 1, wherein, for a read operation of a file, the electronic file system is configured to perform operations comprising:
reading an allocated block number from an allocated block table corresponding to the file; and
reading data, in the electronic physical memory device, from a block identified by the allocated block number.

5. The electronic file system of claim 4, wherein the reading the allocated block number comprises reading the allocated block number from the allocated block table corresponding to the file at a read pointer location.

6. The electronic file system of claim 1, wherein the finite state machine controller and the electronic memory are implemented in a single integrated circuit.

7. The electronic file system of claim 1, wherein each block comprises at least one kilobyte.

8. The electronic file system of claim 1, wherein the electronic physical memory device comprises a flash memory.

9. The electronic file system of claim 1, wherein the electronic file system effectuates file transfer ingress at a rate of at least 10 Gbps.

10. The electronic file system of claim 1, wherein the electronic file system effectuates file storage and retrieval at a rate of at least 10 Gbps.

11. A method of providing an electronic file system for storing and retrieving data from an electronic physical memory device, the electronic physical memory comprising an enumerated plurality of fixed-size blocks, the method implemented using:
a finite state machine controller, and
an electronic memory communicatively coupled to the finite state machine controller, the method comprising:

storing, in the electronic memory, an available block table;

storing, in the electronic memory, a plurality of allocated block tables;

storing, by the finite state machine controller, in the available block table, a block number for a block that is available to store data; and storing, in the electronic memory, by the finite state machine controller, in a respective allocated block table, a block number for a block that stores data of a respective file;

wherein, for a write operation of a file, the method further comprises:

reading an available block number from the available block table at a read pointer location;

writing data, in the electronic physical memory device, to a block identified by the available block number;

writing the available block number to an allocated block table corresponding to the file at a write pointer location;

incrementing the read pointer location; and incrementing the write pointer location.

12. The method of claim 11, wherein the storing the block number for the block that is available to store data takes most two clock cycles, and wherein the storing the block number for the block that stores data of the respective file takes at most two clock cycles.

13. The method of claim 11, further comprising multiple read, write, and delete operations, wherein a lack of desegmentation does not cause performance degradation.

14. The method of claim 11, wherein, for a read operation of a file, the method further comprises:

reading an allocated block number from an allocated block table corresponding to the file; and reading data, in the electronic physical memory device, from a block identified by the allocated block number.

15. The method of claim 14, wherein the reading the allocated block number comprises reading the allocated block number from the allocated block table corresponding to the file at a read pointer location.

16. The method of claim 11, wherein the finite state machine controller and the electronic memory are implemented in a single integrated circuit.

17. The method of claim 11, wherein each block comprises at least one kilobyte.

18. The method of claim 11, wherein the electronic physical memory device comprises a flash memory.

19. The method of claim 11, wherein the electronic file system effectuates file transfer ingress at a rate of at least 10 Gbps.

20. The method of claim 11, wherein the electronic file system effectuates file storage and retrieval at a rate of at least 10 Gbps.

* * * * *